United States Patent [19]

Reinsma

[11] 4,275,890
[45] Jun. 30, 1981

[54] SEAL WITH STIFFENED FORCE-TRANSMITTING PORTION

[75] Inventor: Harold L. Reinsma, Dunlap, Ill.

[73] Assignee: Caterpillar Tractor Co., Peoria, Ill.

[21] Appl. No.: 98,147

[22] PCT Filed: Jul. 16, 1979

[86] PCT No.: PCT/US79/00505

§ 371 Date: Jul. 16, 1979

§ 102(e) Date: Jul. 16, 1979

[87] PCT Pub. No.: WO81/00293

PCT Pub. Date: Feb. 5, 1981

[51] Int. Cl.³ .......................... F16J 15/32; F16J 15/34
[52] U.S. Cl. .................................... 277/84; 277/95;
277/152; 277/179; 305/11
[58] Field of Search .............. 277/84, 92, 95, 152,
277/153, 166, 179, 186, 189; 305/11-13

[56] References Cited

U.S. PATENT DOCUMENTS

| 2,294,105 | 8/1942 | Wallgren | 277/84 X |
|---|---|---|---|
| 2,736,584 | 2/1956 | Riesing | 277/153 |
| 2,736,585 | 2/1956 | Riesing | 277/223 X |
| 2,797,944 | 7/1957 | Riesing | 277/179 |
| 2,830,858 | 4/1958 | Moorman et al. | 277/179 X |
| 3,614,113 | 10/1971 | Burk | 305/11 X |

Primary Examiner—Robert S. Ward, Jr.
Attorney, Agent, or Firm—Wegner, Stellman, McCord, Wiles & Wood

[57] ABSTRACT

A sealing structure (10,110) for use in a joint (11) having a first member (12) axially movable relative to a second member (14). The first member defines a recess (13) receiving the sealing structure which includes an annular seal ring (19,119) having a radially outer annular base portion (20,120) fitted in the recess, a sealing portion (21,121) having a lip (22,122) engaging a surface (15) of the movable member (14) confronting the recess (13). The sealing portion is provided with a stiffener which is bonded or partially encapsulated therein and provided with axially inwardly projecting tongues (30,130) engaged by a spring structure (24,124). In the illustrated embodiment, the spring structure includes one or more Belleville springs (25,26,125) received within the base portion (20,120) of the seal ring and having outer portions (27,127) axially inwardly engaging a flange (32,132) inturned by the axially inner portion of the base. The Belleville springs are arranged to deflect past the flat disposition thereof in the range of movement between the joint members so as to provide an effectively minimum variation in the sealing force applied thereby.

29 Claims, 8 Drawing Figures

SEAL WITH STIFFENED FORCE-TRANSMITTING PORTION

DESCRIPTION

1. Technical Field

This invention relates to seals and in particular to boot-type face seals having associated spring means for maintaining sealing engagement thereof.

2. Background Art

In U.S. Pat. No. 3,614,113 of Duane L. Burke, which patent is owned by the assignee hereof, a boot-type seal is shown for use in sealing a track pin assembly. The seal includes Belleville spring means for biasing opposed portions of the boot into sealing engagement with confronting surfaces of the members to be sealed. The legs of the boot engaged by the opposed Belleville springs are resilient and a bight portion of the boot provides a static seal with a radially outer surface of one of the members to be sealed.

In U.S. Pat. No. 3,269,738, Herman Baumler et al show a seal for use in rotary piston motors wherein a disc spring is embedded in an elastic body and removably connected with a glide ring. The disc spring may be radially slotted.

In U.S. Pat. No. 3,370,895 of George A. Cason, Jr., a seal is shown for use with drilling bits wherein a spring is provided within a rubber sealing ring. The sealing ring, in turn, is bonded to a resilient holding ring. Other patents of less pertinency, while showing a number of different forms of seals, are those of George E. Dunn U.S. Pat. No. 2,338,169; F. W. Koller U.S. Pat. No. 2,481,430; Bernard F. Kupfert et al U.S. Pat. No. 2,814,513; Fred E. Simpson et al U.S. Pat. No. 3,050,346; Harold L. Reinsma U.S. Pat. No. 3,218,107, which patent is owned by the assignee hereof; Seisakusho British Patent No. 1,425,364; and Japanese Patent No. 131,725.

DISCLOSURE OF THE INVENTION

The present invention comprehends an improved seal wherein a resilient annular seal is biased into sealing engagement with one joint member by an improved spring means acting through a stiffener secured to a portion of the resilient seal. The sealing structure utilizes a shear portion of the seal as a static seal, permitting substantially unrestrained axial face movement while maintaining the desirable seal with the engaged member.

The spring means of the seal may comprise a Belleville spring element arranged to provide a substantially constant spring rate for the total effective movement of the seal lip. In the illustrated embodiment, the Belleville spring element passes through the center disposition thereof so as to vary in its spring rate in opposite directions about the spring rate at the center position, thereby effectively minimizing the overall range of the spring rate.

Preferably, the total variation in the spring force should be no greater than approximately ±15% of that found at the flat position of the spring element over at least approximately 60% of its working deflection. In the illustrated embodiment, the total variation in spring force may be no greater than approximately 32 kilograms (65 lbs.).

The seal includes a flexible connecting portion providing effectively unimpeded axial movement of the seal lip portion. The flexible connecting portion further serves to prevent ingress of foreign material into the seal and further prevent loss of lubricant from within the seal.

The seal base portion defines a static seal with the confronting member surface.

In one form, the stiffener spaces the spring mean from the connecting and sealing portions of the seal so as to prevent packing of material or fluid between the seal and spring means.

In one form, the stiffener is mechanically bonded to the seal in preformed slots thereof, and in another form, the stiffener is molded directly into the seal.

The projecting portions of the stiffener engaged by the spring may comprise equiangularly spaced ribs engaging the inner periphery of the Belleville spring.

As the Belleville spring is insensitive to temperature and provides an effectively constant spring force when properly proportioned and loaded, an improved sealing between the joint members is obtained.

The sealing portion of the seal ring may have a relatively large mass so as to effectively maintain a constant seal face angle.

The elements of the sealing structure may be preassembled to form a seal cartridge which may be tested for proper travel, face load and sealing effect prior to installation in the joint.

The joint sealing structure of the present invention is extremely simple and economical of construction while yet providing the highly desirable features discussed above.

BEST MODE FOR CARRYING OUT THE INVENTION

Figure 1:
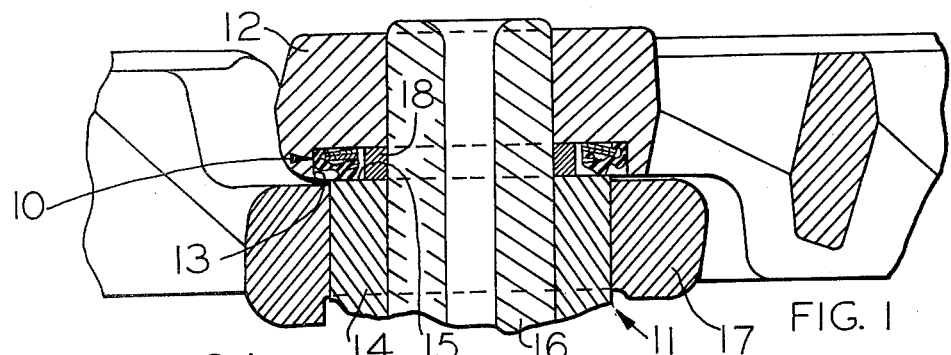
FIG. 1 is a fragmentary diametric section of a sealing structure embodying the invention mounted in a track joint.
Figure 2:
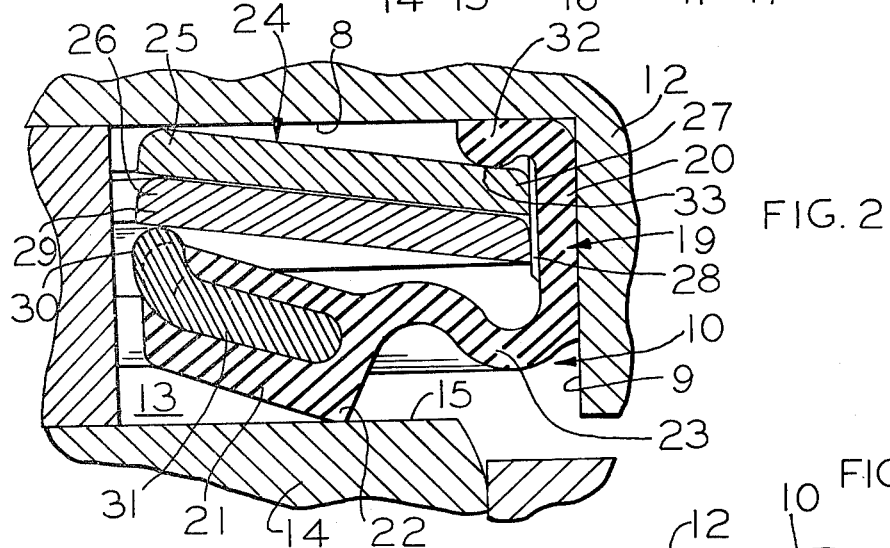
FIG. 2 is a fragmentary enlarged section of a portion of the structure illustrated in FIG. 1.

In one exemplary embodiment of the invention as disclosed in FIGS. 1–4 of the drawing, an improved joint seal generally designated 10 is shown for use in a joint generally designated 11 having a first member 12 defining a cylindrical axially outwardly opening recess 13 and a second member 14 adjacent the first member 12 and defining a sealing surface 15 confronting the recess 13. As shown in FIG. 2, the recess 13 is defined by an end wall 8 and an axially extending circumferential wall 9.

In the illustrated embodiment, the joint comprises a track joint wherein a track pin 16 has an end received in the first joint member 12 which may comprise a portion of a first link of the track joint. The pin is coaxially received in the second joint member which may comprise a bushing of the track pin assembly received in a portion of a second link 17 so as to pivotally connect the links about the axis of the pin 16. As shown in FIG. 1, an annular thrust washer 18 may be disposed coaxially of the pin to extend between first link 12 and bushing 14 limiting the movement of the bushing toward the track link 12 in the operation of the track.

Figure 3:
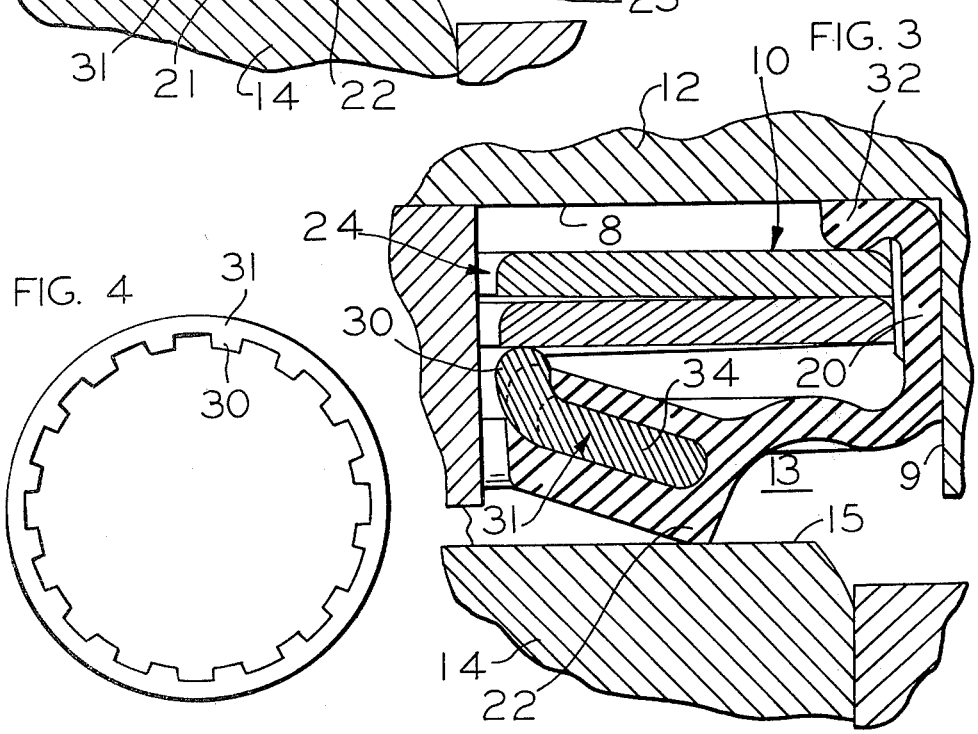
FIG. 3 is a section similar to that of FIG. 2 but illustrating the arrangement of the seal with the joint members spaced axially approximately one-half their maximum spacing.
Figure 5:
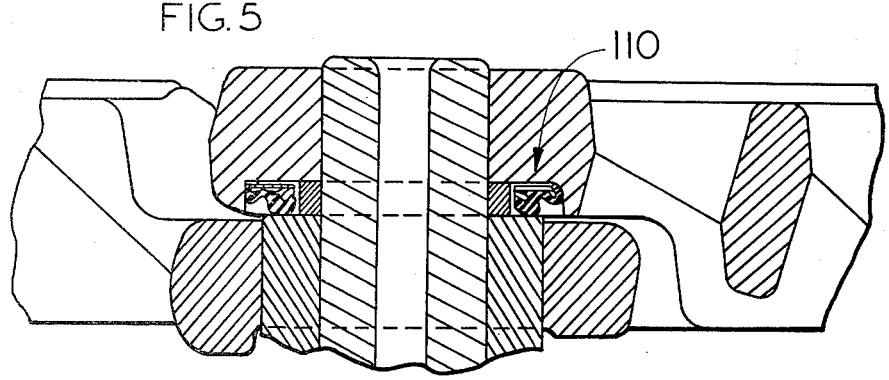
FIG. 5 is a fragmentary diametric section of a joint having a modified form of seal embodying the invention.

However, as illustrated in FIGS. 2 and 3, bushing 14 may have a range of axial movement away from link 12, thereby varying the axial dimension of the recess 13, and thereby requiring that the sealing structure 10 be operable over this range of axial movement. As indicated above, a number of prior art structures have been provided for use in connection with sealing such track links. The present invention comprehends an improved sealing structure 10 which provides a positive maintained seal between the relatively movable members 12 and 14 and which is extremely simple and economical of construction.

As best seen in FIGS. 2 and 3, the sealing structure includes an annular seal ring 19 having a radially outer base portion 20 received coaxially in the recess 13 in sealing engagement with the axially extending circumferential wall 9. The annular seal 19 further defines a sealing portion 21 defining a lip 22 sealingly engaging the surface 15 of bushing 14.

Sealing portion 21 is connected to base portion 20 by a flexible connecting portion 23 which acts in the manner of a corrugated diaphragm to flexibly support the sealing portion 21 for movement to maintain the sealing engagement of lip 22 with the bushing surface 15 at all times over the range of relative axial movement between the bushing 14 and link 12, as illustrated in FIGS. 2 and 3.

Flexible connecting portion 23 cooperates with base portion 20 and with an axially inner flange 32 projecting radially inwardly therefrom in sealing engagement with end wall 8 of recess 13 in transmitting positive driving torque to lip 22.

Lip 22 is maintained in sealing engagement with the surface 15 through the biasing action of spring means generally designated 24 disposed in recess 13 axially inwardly of the seal ring portions 21 and 23. As shown in FIG. 2, the spring means 24 may comprise a pair of frustoconical annular Belleville springs 25 and 26. The radially outer portions 27 of the springs 25 and 26 are supported on a plurality of ribs 28 projecting radially inwardly from base portion 20. In the illustrated embodiment, three such ribs are provided on base portion 20 at 120° spacing. The ribs 28 concentrate a force reactive to the force exerted thereon by the springs and transmit this reactive force to base portion 20. The transmitted force maintains a static seal between base portion 20 and the circumferential wall 9 of recess 13 and assures positive torque transmission therefrom to seal ring 19.

Figure 4:
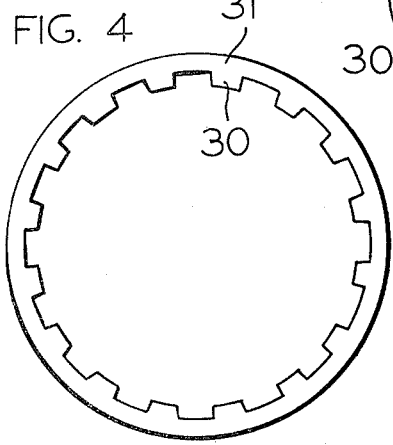
FIG. 4 is an end elevation of the stiffener ring.

Radially inner end 29 of spring 26 engages a plurality of axially inwardly projecting tongues 30 of an annular stiffener 31 which, in the embodiment shown, includes a portion 34 molded into the sealing portion 21. However, it is to be understood that stiffener 31 may be secured to the sealing portion 21 by other suitable bonding means, for example, by chemical adhesives. As shown in FIG. 4, the stiffener tongues 30 project at equiangularly spaced positions from the stiffener, and, in the illustrated embodiment, 16, such tongues are provided for uniformly transferring the spring force from spring means 24 to the lip 22 through stiffener 31 and sealing portion 21 of the seal ring.

Seal ring 19 is preferably formed of a torsionally stiff, axially flexible, low stress, fatigue resistant material, such as injection molded polyurethane, illustratively having a Shore D durometer hardness in the range of approximately 30 to 65. The stiffener ring may be formed of metal, a rigid synthetic resin material, etc., as desired. Illustratively, stiffener 31, in the illustrated embodiment, is formed of steel having a thickness of approximately 1.91 mm (0.075"). Sixteen tongues 30 are provided on the stiffener ring having a circumferential width of approximately 3 to 4 mm with a spacing therebetween of approximately 9.6 mm. The springs 25 and 26 have a thickness of approximately 1.14 mm (0.045").

As shown in FIGS. 2 and 3, base 20 of the seal ring is provided with a radially inturned, axially inner flange 32 having an axially outer rounded portion 33 engaged by the outer portion 27 of spring 25 to cooperate with the ribs 28 in assuring unimpeded free movement of the springs as between the fully flexed position of FIG. 2 to the mid-disposition of FIG. 3. As indicated briefly above, the Belleville springs are preferably arranged so as to move past the center position thereof over the range of movement between the joint members 14 and 12. The axially outer rounded portion 33 of the flange 32 functions as a built-in spacer providing suitable clearance to permit the Belleville springs to be deflected past their flat position. Flange 32, as shown, further provides static sealing against end wall 8 of the recess 13. Still further, flange 32 provides an anchor point for transmitting torque through base portion 20 and connecting portion 23 for rotationally driving the seal by virtue of the spring force reacting on flange 32. Thusly, the spring means effectively provides a substantially constant spring rate affording improved sealing characteristics in the sealing structure 10. Illustratively, the spring means 24 may vary in force applied to the lip 22 from between 155 to 125 kilograms (340 to 275 lbs.) and thereby providing a relatively small variation in the applied sealing force over the entire range of movement between the joint members.

Pursuant to the general configuration of the seal assembly 10 as illustrated in FIGS. 2 and 3, flange 32 cooperates with base portion 20, connecting portion 23, and sealing portion 21 to effectively isolate the seal and joint interior surfaces from the external environment in which the seal operates.

Referring now to the embodiment of FIGS. 5-8, a modified form of sealing structure generally designated 110 is shown to comprise a sealing structure generally similar to sealing structure 10 in utilizing an annular seal ring 119 having a base portion 120 received in the recess 13, a flexible connecting portion 123, and a sealing portion 121.

Figure 6:
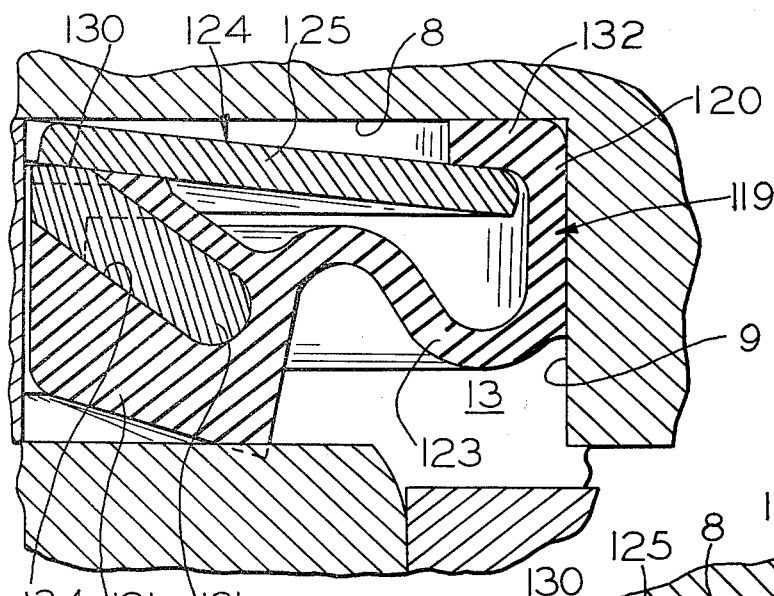
FIG. 6 is a fragmentary enlarged section showing the modified form of seal in greater detail.
Figure 7:
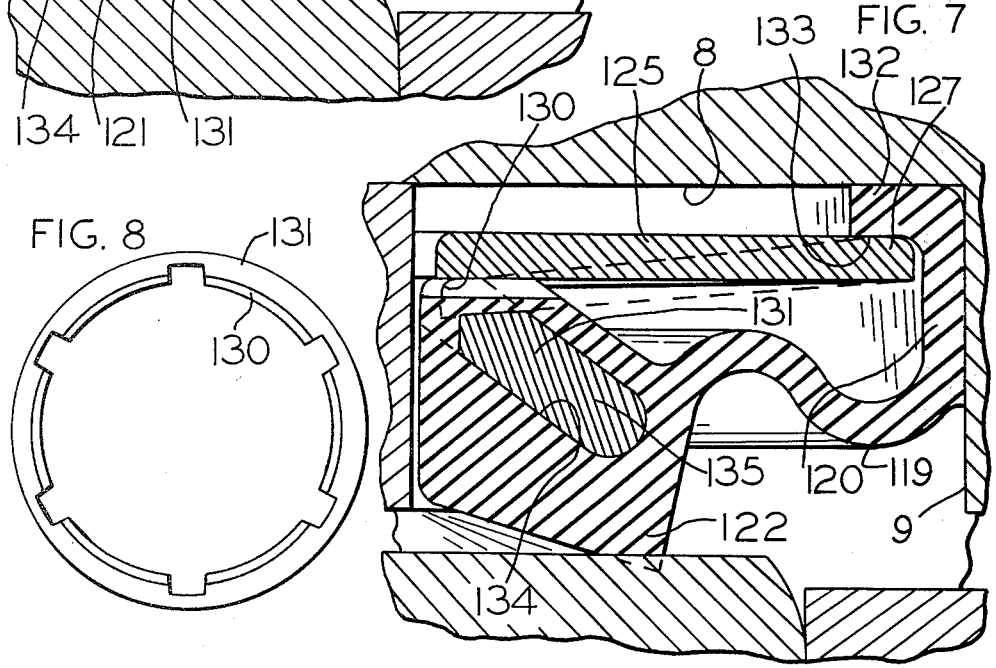
FIG. 7 is a fragmentary section similar to that of FIG. 6 but showing the arrangement of the joint which the members thereof spaced axially approximately one-half their maximum spacing.
Figure 8:
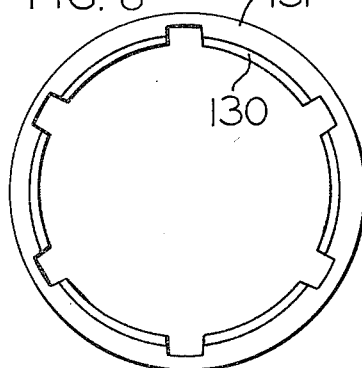
FIG. 8 is an end view of the stiffener ring thereof.

As best seen in FIGS. 6 and 7, the spring means generally designated 124 utilizes a single Belleville spring 125 engaging the projecting portion 130 of the stiffener 131. The sealing portion is provided with an annular slot 134, the portion 135 of stiffener 131 being molded or bonded into the slot as desired. As shown in FIG. 8, the stiffener may comprise an annular member having six circumferentially relatively wide tongues 130 spaced apart equiangularly so as to provide a distributed transfer of the spring force to the sealing lip 122 of the seal ring 119.

As best seen in FIG. 7, the flange 132 of seal ring base 120 has a planar axial surface 133 engaged by the radially outer portion 127 of the Belleville spring 125.

The sealing structure 110 thusly is generally similar to sealing structure 10 and functions in a similar manner. Elements of sealing structure 110 which are similar to corresponding elements of sealing structure 10 are identified by the same reference numerals except 100 higher.

INDUSTRIAL APPLICABILITY

The sealing structures 10 and 110 provide an improved preloaded seal for use in joints having axially movable members against one axial face of which the movable seal lip is urged. Thus, the invention may be utilized in a wide range of industrial applications, including the illustrated embodiment of a track link joint.

The improved sealing means of the present invention therefore is advantageously adapted both for use in joints where improved face travel, a substantially constant spring force, and insensitivity to temperature variations are desired. The sealing means further is insensitive to all oils and exhibits virtually no "set" as opposed to conventional elastomeric load elements. As indicated above, the use of the Belleville springs in the unique arrangement disclosed facilitates preassembly of the seal and provides controlled, effectively minimized spring force variation and, by virtue of the temperature insensitivity of the springs, assures good sealing by the seal over a wide range of temperatures and environmental conditions.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a joint (11) having a first member (12) defining a cylindrical axially outwardly opening recess (13) having an end wall (8) and an axially extending circumferential wall (9), a second member (14) adjacent said first member and defining a sealing surface (15) confronting said recess, said members being associated to have relative rotational movement about the axis of the recess and relative axial movement toward and from each other, an improved sealing structure (10,110) in said recess for movably sealing said members, comprising:
    an annular seal (19,119) having a radially outer base portion (20,120) received coaxially in said recess (13), an annular sealing portion (21,121) defining a lip (22,122) sealingly engaging said confronting sealing surface (15), and a flexible connecting portion (23,123) extending between said base portion (20,120) and sealing portion (21,121) for movably supporting said sealing portion;
    an annular rigid stiffener (31,131) coaxially in said seal sealing portion (21,121) and having a projecting portion (30,130) extending inwardly away from said confronting sealing surface (15); and
    spring means (24,124) coaxially in said recess and acting between said first member and said stiffener projecting portion to urge said lip into maintained movable sealed engagement with said confronting surface while sumultaneously permitting relative axial movement between said members.

2. The joint sealing structure of claim 1 wherein said spring means (24) comprises a plurality of Belleville springs (25,26) each biased outwardly toward said second member sealing surface (15).

3. The joint sealing structure of claim 1 wherein said base portion (20,120) defines radially inwardly extending support means (28,32,132) for coaxially retaining said spring means.

4. The joint sealing structure of claim 1 wherein said base portion (20,120) defines a plurality of annularly spaced radially inwardly extending ribs (28) for coaxially retaining said spring means.

5. The joint sealing structure of claim 1 wherein said base portion (20,120) is provided with a radially inwardly extending spring support (20,32,132) said spring means (24) defining a radially outer portion (27) engaging said support.

6. The joint sealing structure of claim 1 wherein said base portion (20,120) is provided with a radially inwardly extending axially outwardly rounded spring support (20,32,132) said spring means (24) defining a radially outer portion (27) engaging said support.

7. The joint sealing structure of claim 1 wherein said seal (119) comprises a molded synthetic resin element, said sealing portion being integrally formed partially about said stiffener (131).

8. The joint sealing structure of claim 1 wherein said connecting portion (23,123) comprises a wavy annular portion.

9. The joint sealing structure of claim 1 wherein said spring means (24) comprises a plurality of substantially similar Belleville springs (25,26) each biased outwardly toward said second member sealing surface (15).

10. The joint sealing structure of claim 1 wherein said stiffener projecting portion (30,130) defines a plurality of equiangular spaced lugs engaging said spring means (24,124).

11. The joint sealing structure of claim 1 wherein said stiffener (31) is mechanically bonded in said seal (19).

12. The joint sealing structure of claim 1 wherein said spring means (24) comprises Belleville spring means arranged to deflect past the flat position thereof in the range of relative axial movement of said members (12,14).

13. The joint sealing structure of claim 1 wherein said spring means (24) comprises a plurality of substantially similar Belleville springs (25,26) each biased outwardly toward said second member sealing surface (15) with a range of spring force developed thereby over 60% of its working deflection of no greater than approximately ±15% of that force developed at its flat position.

14. In a joint (11) having a first member (12) defining a cylindrical axially outwardly opening recess (13), a second member (14) adjacent said first member and defining a sealing surface (15) confronting said recess, said members being associated to have relative rotational movement about the axis of the recess and relative movement toward and from each other in the direction of said axis, an improved sealing structure (10,110) in said recess for movably sealing said members, comprising:
    an annular seal (19,119) having a radially outer base portion (20,120) received coaxially in said recess (13), an annular sealing portion (21,121) defining an axially inner sealing lip (22,122) sealingly engaging said confronting sealing surface (15), said sealing portion further defining an axially outer force-transmitting portion, and a flexible connecting portion (23,123) extending between said base portion (20,120) and sealing portion (21,121) for movably supporting said sealing portion;

stiffening means for stiffening said force transmitting portion of the seal, said stiffening means defining a force transfer portion; and spring means (24,124) retained coaxially in said recess and acting through said force transfer portion of the stiffening means to urge said sealing lip into maintained movable sealed engagement with said confronting surface notwithstanding relative axial movement between said members.

15. The joint sealing structure of claim 14 wherein said force transfer portion defines an exposed surface engaged by said spring means.

16. The joint sealing structure of claim 14 wherein said force transfer portion defines an axially outwardly facing exposed surface engaged by said spring means.

17. The joint sealing structure of claim 14 wherein said force transfer portion defines an axially outwardly projecting surface engaged by said spring means.

18. The joint sealing structure of claim 14 wherein said force transfer portion defines an exposed rounded surface engaged by said spring means.

19. The joint sealing structure of claim 14 wherein said force transfer portion defines an exposed surface engaged by said spring means, and a portion embedded in the force-transmitting portion of the seal.

20. The joint sealing structure of claim 14 wherein said force transfer portion defines an exposed surface engaged by said spring means, and a generally radially extending portion embedded in the force-transmitting portion of the seal.

21. The joint sealing structure of claim 14 wherein said stiffening means is formed of metal.

22. The joint sealing structure of claim 14 wherein said stiffening means force transfer portion defines a projecting portion extending away from said sealing surface confronting the recess.

23. The joint sealing structure of claim 14 wherein said spring means comprises Belleville spring means arranged to deflect past the flat position thereof in the range of relative axial movement of said members to effectively minimize variation in force applied by said spring means through said stiffening means to said sealing lip over said range of movement.

24. The joint sealing structure of claim 24 wherein said spring means (24) comprises a plurality of coaxially stacked Belleville springs (25,26).

25. The joint sealing structure of claim 23 wherein the difference between the maximum and minimum force exerted by said spring means (24) over 60% of the range of relative axial movement of said members is no greater than approximately ±15% of that force developed at its flat position.

26. The joint sealing structure of claim 23 wherein said base portion (20) defines a plurality of spring-centering, equiangular spaced ribs (28) engaging the outer periphery (27) of the Belleville springs.

27. In a joint (11) having a first member (12) defining a cylindrical axially outwardly opening recess (13) having an end wall (8) and an axially extending circumferential wall (9), a second member (14) adjacent said first member and defining a sealing surface (15) confronting said recess, said members being associated to have relative rotational movement about the axis and relative axial movement toward and from each other in the direction of said axis, an improved sealing structure (10,110) in said recess for movably sealing said members, comprising:

an annular seal (19,119) received coaxially in said recess (13), said annular seal having a radially outer base portion (20,120) sealingly engaging said circumferential wall (9), a flange portion (32,132) extending radially inwardly from said base portion (20,120) sealingly engaging said end wall (8), an annular sealing portion (21,121) defining a lip (22,122) sealingly engaging said confronting sealing surface (15), and a flexible connecting portion (23,123) extending between said base portion (20,120) and said sealing portion (21,121), said connecting portion (23,123) cooperating with said base portion (20,120) and said flange portion (32,132) in transmitting driving torque from said first member (12) to said lip (22,122);

an annular rigid stiffener (31,131) having a first portion (34,134) embedded coaxially in said seal sealing portion (21,121) and a projecting portion (30,130) extending inwardly away from said confronting sealing surface (15); and spring means (24,124) disposed coaxially in said recess (13) between said relatively axially movable first and second members, said spring means acting between said first member (12) and said stiffener projecting portion (30,130) to urge said lip (22,122) into maintained movable sealed engagement with said confronting surface (15), said spring means (24,124) further acting on said base portion (20,120) and on said flange portion (32,132) to urge said base and flange portions into positive static sealing and torque transmitting engagement with said circumferential wall (9) and said end wall (8), respectively.

28. The joint sealing structure of claim 27 wherein said projecting portions (30,131) comprise a plurality of spaced projections.

29. The joint sealing structure of claim 27 wherein said first portion is bonded to said seal.

* * * * *